United States Patent [19]

Drew et al.

[11] Patent Number: 5,015,313

[45] Date of Patent: May 14, 1991

[54] PROCESS FOR HEAT SEALING PACKAGES

[75] Inventors: Terrence M. Drew; Chris A Hanson; Alden B. Hanson, all of Boulder, Colo.

[73] Assignee: Alden Laboratories, Inc., Boulder, Colo.

[21] Appl. No.: 435,087

[22] Filed: Nov. 9, 1989

[51] Int. Cl.$^5$ .................. B32B 31/00; B32B 31/20; C09J 5/02

[52] U.S. Cl. .................. 156/87; 156/275.1; 156/285; 156/308.4; 156/308.8

[58] Field of Search .................. 156/87, 308.8, 308.4, 156/275.1, 308.2

[56] References Cited

U.S. PATENT DOCUMENTS

| | | | |
|---|---|---|---|
| 3,402,411 | 9/1968 | Hanson | 12/142 |
| 3,635,849 | 1/1972 | Hanson | 260/2.5 B |
| 3,679,509 | 7/1972 | Fielibert | 156/308.4 |
| 3,738,886 | 6/1973 | Southgate | 156/274.4 |
| 3,851,444 | 12/1974 | Merat | 53/167 |
| 3,869,329 | 3/1975 | Schweitzer et al. | 156/308.8 |
| 4,038,762 | 8/1977 | Swan, Jr. | 36/89 |
| 4,083,127 | 4/1978 | Hanson | 36/93 |
| 4,108,928 | 8/1978 | Swan, Jr. | 264/26 |
| 4,117,306 | 9/1978 | Shah | 219/243 |
| 4,144,658 | 3/1979 | Swan, Jr. | 36/117 |
| 4,229,546 | 10/1980 | Swan, Jr. | 521/55 |
| 4,243,754 | 1/1981 | Swan, Jr. | 521/55 |
| 4,604,318 | 8/1986 | Prior et al. | 264/46.4 |
| 4,857,129 | 8/1989 | Jensen et al. | 156/308.2 |

OTHER PUBLICATIONS

Farkas, R. D., *Heat Sealing*, Reinhold Publishing Corp., New York: 1964, p. 81.

*Primary Examiner*—Michael W. Ball
*Assistant Examiner*—Chester T. Barry
*Attorney, Agent, or Firm*—Sheridan, Ross & McIntosh

[57] ABSTRACT

A sealing process for producing clean, contamination-free seals. The process includes the step of incorporating a small amount of polar liquid within the material to be sealed between heat-sealable layers. An alternating electromagnetic energy field, such as that produced by a dielectric heating device, is applied to the seal area. The energy vaporizes the polar liquid, thereby cleaning the seal area. Subsequently, the energy causes the resinous layers to seal together, sealing the material within the package. A preferred composition for sealing within the resinous package is also disclosed. The material includes a polar liquid, a surfactant, wax, oil and microbeads. The material is especially suited for producing padding devices.

10 Claims, 1 Drawing Sheet

PROCESS FOR HEAT SEALING PACKAGES

FIELD OF THE INVENTION

This invention relates generally to the heat sealing of materials within plastic packages, and in particular, methods for sealing flowable, pressure-compensating materials within a package using an alternating electromagnetic energy field and materials usable with said method.

BACKGROUND OF THE INVENTION

It is well known to place materials within packages, such as plastic packages or packages comprising resinous materials, and sealing the material therein using heat. For example, liquid or semi-liquid materials are typically placed in a pliable package, such as between two leak-proof resinous sheets which are subsequently sealed together at the edges using electromagnetic radiation. One problem encountered with such packages is that the contained material can spread and contaminate the seal area prior to sealing. As a result, during the sealing process the material becomes entrapped within the seal, reducing the effectiveness of the seal. Problems resulting from such contaminated seals are well known in the art. For example, contaminants within the sealed area can prevent the resinous sheets from sealing together, causing a weakness in the seal. Additionally, in applications where appearance is important, the contaminants in the seal area can be unsightly. Furthermore, if the area of contamination is large enough to compromise the seal, material can leak out of the package.

U.S. Pat. No. 4,117,306 by Shah issued Sept. 26, 1978, discloses a device for enabling the detection of contaminants within a sealed area. This device includes a grooved, heated sealing bar and a grooved anvil, which together produce a corrugated seal. The corrugated seal provides for the visible detection of contamination in a seal area. However, this device only permits detection of the contamination, it does not reduce or eliminate the problem of contamination.

U.S. Pat. No. 3,851,444 by Merat issued Dec. 3, 1974, discloses a device for keeping air borne contaminants, such as dust or powder, away from a seal area. This mechanical device protects the seal area during the filling of a package and is then removed. This provides a clean area for sealing. However, there is no disclosure of a method for removing contaminants from the seal area after filling and prior to sealing.

A particular type of materials which are typically sealed within a package are flowable, pressure-compensating materials. A common use for such materials is in padding devices. In use, the flowable, pressure-compensating materials are typically placed in a pliable package, such as between two leak-proof resinous sheets which are sealed at the edges. The flowable materials act hydraulically. An applied force causes flowable, pressure-compensating material to migrate from areas of higher pressure to areas of lower pressure until pressure throughout the package is uniform. Once conformity has been achieved, force is distributed substantially equally over the entire surface of the package thus alleviating the differential pressure problems associated with prior devices. Flowable, pressure-compensating materials are presently marketed under the trademark FLOLITE TM by Alden Laboratories, Inc. of Boulder, Colo. U.S.A.

In order to function properly, the flowable, pressure-compensating materials must occupy all, or substantially all of the volume of the package in which they are contained. In this way, when pressure is applied to a package which contains flowable, pressure-compensating material, the material may flow to conform to the shape of the pressure applying object, but its flow is restrained by the volume of the package. Therefore, the material can support and distribute the force of the pressure applying object. However, during the production of such padding devices, it is often difficult to remove excess air from the unsealed package prior to sealing without contaminating the seal area with the material.

Various padding devices which do not employ flowable, pressure-compensating material are generally available. Examples include liquid- or gas-filled bladders, e.g. water-filled cushions and pneumatic pads; and gases or liquids dispersed in a solid material, e.g. foams and gels. Generally, such padding devices operate on the principle of conformation to the shape of an object when placed under pressure. When a force, such as a person's mass, is placed on such a padding device, the device deforms so as to conform to the shape of the pressure applying object in order to distribute the force over as large an area as possible. These devices perform adequately when the object being padded has a relatively large, uniformly shaped surface area. However, when the object being padded includes a relatively small area of concentrated force, such as that caused by a protuberance, the majority of known padding devices do not perform to adequately reduce the discomfort of users in many applications. This is because many padding devices exert greater responsive pressure on the area of concentrated force.

The problem can be described with reference to a padding device comprising a gas dispersed in a solid material, e.g. foam. Tiny gas bubbles in foam act like millions of coil "springs." When required to conform to an irregular shape, such as a human body, the "springs" are compressed to varying degrees, each pushing back on the body with a force proportional to the amount of compression. Intimate conformity is best obtained with a relatively soft foam, which can be compared to weak "springs." The pressure on protuberances, where the "springs" are greatly compressed, will be relatively high, possibly causing pain and reduced circulation. The problem is even more pronounced if a stiffer foam is employed, because the "springs" are stronger.

In order to alleviate the problem of differential pressure inherent with many prior art materials, flowable, pressure-compensating materials were developed. Such materials and applications thereof are described in U.S. Pat. No. 3,402,411 by Alden Hanson, issued Sept. 24, 1968; U.S. Pat. No. 3,635,849 by Alden Hanson, issued Jan. 18, 1972; U.S. Pat. No. 4,038,762 by Swan, Jr., issued Aug. 2, 1977; U.S. Pat. No. 4,083,127 by Chris Hanson, issued Apr. 11, 1978; U.S. Pat. No. 4,108,928 by Swan, Jr., issued Aug. 22, 1978; U.S. Pat. No. 4,144,658 by Swan, Jr., issued Mar. 20, 1979; U.S. Pat. No. 4,229,546 by Swan, Jr., issued Oct. 21, 1980; and U.S. Pat. No. 4,243,754 by Swan, Jr., issued Jan. 6, 1981. As used herein, the term "flowable, pressure-compensating materials" will include the materials disclosed in these patents. Each of these U.S. patents is incorporated herein by reference in its entirety. These patents will collectively be referred to as the "flowable, pressure-compensating material patents."

The preferred materials disclosed in U.S. Pat. No. 3,402,411 comprise 20 to 25 weight percent polyisobutylene, 25 to 37.5 weight percent of an inert oil, e.g. mineral oil or a saturated ester oil or a mixture thereof and 42.5 to 50 weight percent inorganic filler. U.S. Pat. No. 3,635,849 discloses a composition consisting essentially of from about 5 to about 45 weight percent of a polyolefin, particularly polyisobutylene, from about 15 to about 70 weight percent of a paraffin and from about 5 to about 80 weight percent oil. Lightweight aggregate materials, for example, polystyrene beads or a heavy aggregate such as $Fe_3O_4$ can also be added.

The flowable, pressure-compensating materials disclosed in U.S. Pat. Nos. 4,038,762, 4,108,928 and 4,243,754 include from 21.39 to 77.96 weight percent oil, 21.04 to 69.62 weight percent wax and 1 to 9 weight percent microbeads. The inclusion of water in the compositions disclosed in these patents is discouraged. It is disclosed that because water generally increases the specific gravity of the finished fitting material, and does not serve any functional or necessary purpose in the finished fitting material, it is very desirable that if it is present in the finished fitting material, that it not be present in amounts or levels that exceed tolerable, minimal or residual levels (e.g. up to or not exceeding 8 weight percent, preferably up to or not exceeding 3 or 5 weight percent).

U.S. Pat. Nos. 4,144,658 and 4,229,546 disclose flowable, pressure-compensating materials comprising 10 to 60 weight percent hollow, glass microbeads, 8.5 to 34 weight percent wax and 26.5 to 81 weight percent oil. U.S. Pat. No. 4,083,127 discloses a flowable, pressure-compensating fitting material consisting essentially of discrete, lightweight, sturdy microbeads distributed throughout a continuous phase of wax and oil.

The materials described in the flowable, pressure-compensating material patents represent an advance in the art in terms of force distribution and stability. The materials distribute forces better than foams and gels because the force is evenly distributed, irrespective of the shape of the force applying object. Additionally, they represent advances in terms of responsiveness when compared to less viscous fluids such as water-filled devices. Logically, it would appear that water would be an excellent cushioning material because of its capability to almost instantaneously flow to achieve conformability. However, incompressible materials which provide almost instantaneous conformability do not provide as much control and stability as flowable, pressure-compensating materials, which do not respond to instantaneously applied pressure. Anyone who has attempted to sit on a waterbed is familiar with the lack of stability associated with water-cushioned devices. However, in spite of the advantages which flowable, pressure-compensating materials have over prior art padding materials, there could still be improvement in the compositions with respect to problems caused by contaminated seals.

Therefore, it would be advantageous to provide a method which reduces or eliminates the problem of contaminated seals. It would be advantageous if such a method were simple and easy to perform. It would also be advantageous if the method could be performed on seals which have been contaminated with flowable, pressure-compensating materials. In particular, it would be advantageous to provide a method for heat sealing a flowable, pressure-compensating material within a resinous package while simultaneously reducing the amount of excess air within the package and reducing the problems associated with contaminated seals. Additionally, it would be advantageous if a composition usable in such a method could be provided.

SUMMARY OF THE INVENTION

In accordance with the present invention, a method for sealing a material within a plastic package is provided. The method includes the steps of placing a polar liquid-containing material within the package. An alternating electromagnetic energy field, such as that supplied by a dielectric heating device, is applied to the portion of the package which is to be sealed. The electromagnetic energy vaporizes the polar liquid. The application of the electromagnetic energy is continued until the desired portion of the plastic package is sealed. Preferably, the polar liquid is water, preferably present in an amount from about 0.5 to about 5 weight percent, based on the total weight of the material to be sealed within the package.

Preferably the material to be sealed within the plastic package is a flowable, pressure-compensating material which includes a polar liquid, a surfactant, wax, oil and substantially spherical particles or microbeads. The amount of polar liquid is selected so that when electromagnetic energy is applied during a sealing process, the polar liquid vaporizes and clears the seal area of contaminating material. However, the amount of polar liquid is limited to prevent arcing between the electrodes of the dielectric heating device.

DETAILED DESCRIPTION OF THE INVENTION

Figure 1:
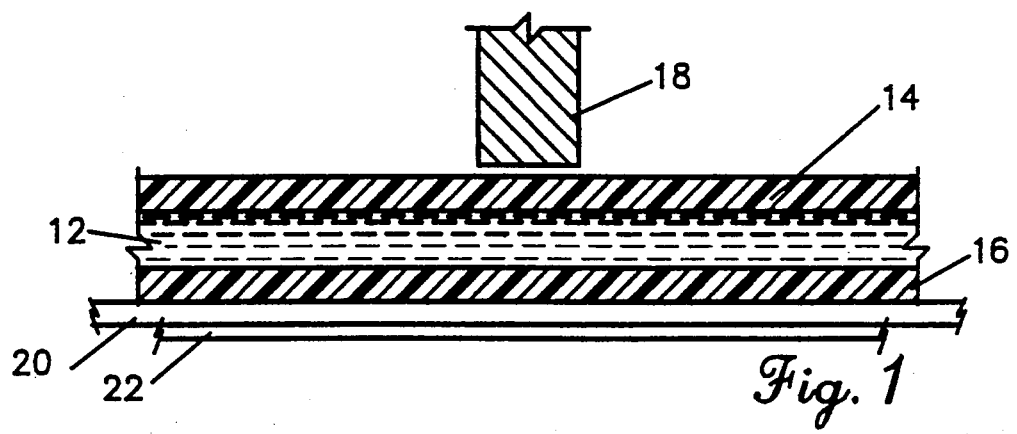
FIG. 1 illustrates an initial step in an embodiment of the contaminated seal process of the present invention prior to the time the sealing die/electrode contacts the upper resinous layer of the package.

In accordance with the process of the present invention, a polar liquid-containing material is placed within a resinous package and is heated to its boiling point, before the resinous layers become heated to the melting point. In this way, the polar liquid vaporizes, clearing contaminating material from the sealing area. Once the polar fluid has vaporized, the resinous package materials are heated and ultimately melt together to form a seal.

The process of the present invention will be described with reference to FIGS. 1 through 4 In FIG. 1, a material 12, preferably a flowable, pressure-compensating material, is shown between two sheets of resinous material 14 and 16. A sealing die/electrode 18 is shown above the top resinous sheet 14. Below the bottom resinous sheet 16 is a Mylar(TM) buffer 20. As will be appreciated by one skilled in the art, the sealing die/electrode 18 is a first electrode, and a second electrode 22 is located below the Mylar(TM) buffer 20. If desired, air can be removed from between the two resinous sheets 14 and 16 at this point. For example, pressure can be applied to force air bubbles out or a vacuum can be employed to remove air.

Figure 2:
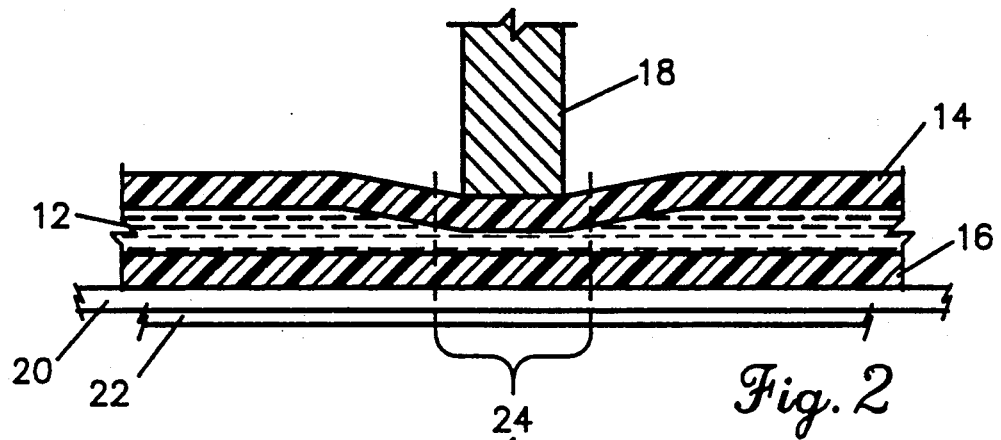
FIG. 2 illustrates a subsequent step in the process in which the sealing die/electrode has contacted the upper resinous layer of the package.

In FIG. 2, the sealing die/electrode 18 is lowered from the position shown in FIG. 1 and contacts and depresses the upper resinous sheet 14. A portion of the material 12 is forced in an outward direction away from the area 24 where the sealing die/electrode 18 applies pressure. However, a portion of the material 12 undesirably remains within the seal area 24. If a seal were to be effected at this point, the material 12 trapped between the resinous sheets 14 and 16, in the seal area 24 would have a deleterious effect on the seal.

Figure 3:
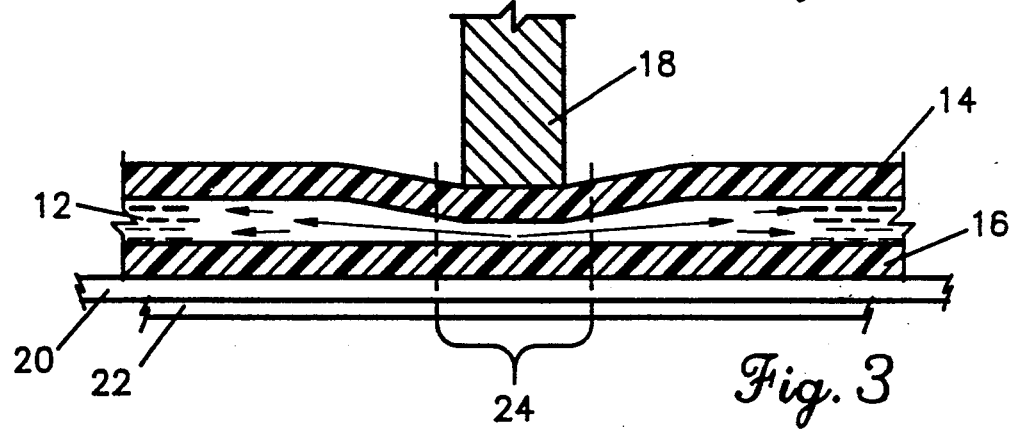
FIG. 3 illustrates a subsequent step in the process in which heating energy has begun to vaporize the material between the two resinous layers.

In FIG. 3, the cleaning or "blow out" step of the process is illustrated. Electromagnetic energy, for example a radio frequency energy field, is emitted between the sealing die/electrode 18 and the lower electrode 22. This radio frequency energy field causes polar molecules to rapidly vibrate, creating molecular friction and resulting in the heating of polar materials. Consequently, a polar liquid contained within the material 12 vaporizes, causing the contaminating material to be blown out of the sealing area 24 as indicated by the arrows in FIG. 3. Additionally, the polar liquid preferentially absorbs the thermal energy, thereby acting as a heat sink. This prevents the resinous sheets 14 and 16 from sealing together until the sealing area 24 is cleared of contaminants by the vaporized polar fluid.

Figure 4:
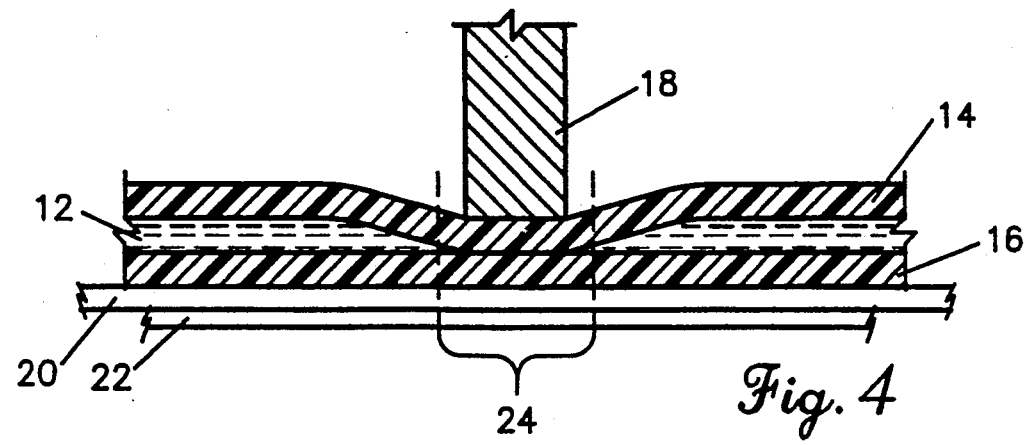
FIG. 4 illustrates a subsequent step in the process in which heating energy is applied to the two resinous layers in order to seal them together.

In the final step, illustrated in FIG. 4, the sealing area 24 has been substantially cleared of contaminating material and the radio frequency energy is transformed into thermal energy by polar molecules within the resinous sheets 14 and 16, causing them to soften and ultimately seal together.

In accordance with another embodiment of the present invention, the material 12 which is placed between the resinous sheets 14 and 16, is a flowable, pressure-compensating material of the type described in the flowable, pressure-compensating material patents, incorporated by reference in their entirety herein. However, in addition to the ingredients in the materials disclosed in these patents, a surfactant and a polar liquid are also included within the material.

The polar liquid is preferably water, but can be other polar liquids such as alcohol. Water is preferred because the steam generated during the sealing process is non-toxic. Additionally, water is not flammable, so if arcing should occur during the sealing process, it will not ignite the water.

When water is employed as the polar liquid, it is preferably present in an amount from about 0.5 weight percent to about 5 weight percent, based on the total weight of the material 12. At amounts less than 0.5 weight percent, there typically is not enough steam generated during the process to adequately clear out contaminating material from the sealing area. At amounts greater than 5 weight percent, the water can cause undesirable arcing between the two electrodes of the dielectric heating device.

While not wishing to be bound by any theory or explanation, it is believed that the reason water and surfactant must be added to the flowable, pressure-compensating materials is that the basic ingredients (e.g. wax and oil) found in the prior art materials are transparent to radio and microwave frequency energy fields. To form a good contamination-free seal, the prior art materials must be boiled out of the seal area before the resinous layers melt, or they will become trapped in the seal area. In prior art materials, these contaminants could only be heated to a boiling point via conduction of heat from the resinous package material. However, the resinous layers were in a molten state as the vaporization of the wax and oil occurred. As a result, contaminating material was trapped between the resinous material in the seal area. With prior art materials it was extremely difficult to obtain a good seal free of contaminating material.

However, in accordance with the present invention, when polar liquid such as water is incorporated in the material using a surfactant to finely disperse the liquid, a good, clean seal can be obtained at a lower power setting. It is believed that the polar liquid which is added to the material allows the material to heat up and preferentially blow out the contaminants while keeping the resinous layers below the melting temperature until substantially all the contaminants have been cleared. The resinous layers are then heated to the melting temperature and a good seal is formed. However, the amount of polar liquid which can be employed is limited. As the amount of polar liquid increases, the chances that arcing will occur also increase. Therefore, the polar liquid should be limited to less than about 5 percent by weight.

The purpose of the surfactant is to insure that the polar liquid can be uniformly and finely dispersed within the material. Because the preferred materials are flowable, pressure-compensating materials which include oil and wax, water alone will not easily mix with the oil and wax. Therefore, a surfactant is added to help distribute the water evenly throughout the composition. Preferably, the surfactants have a low Hydrophile-Lipophile Balance (HLB). The HLB is an expression of the size and strength of the hydrophilic (water-loving or polar) and lipophilic (oil-loving or non-polar) groups of the surfactant. A surfactant that is lipophilic in character is assigned a low HLB number (below 9.0). Preferably, the surfactants employed in the compositions of the present invention have an HLB of less than 9 and most preferably have an HLB of less than 7. Examples of suitable surfactants include formulations sold under the names BRIJ-72, BRIJ-76, and BRIJ-92, all available from ICI Americas Inc.

It is important that the polar liquid, such as water, be uniformly distributed throughout the mixture. If this is not the case, the contaminating material may not be effectively cleared out from the sealing area. Additionally, the resinous material may be heated unevenly, with some areas prematurely melting to a greater degree than adjacent areas. The importance of having water finely dispersed throughout the composition was demonstrated in tests conducted with compositions which did not include water and surfactant. Instead, water was manually spread around the seal area. However, the water beaded, resulting in uneven heating and inadequate clearing of contaminated material from the seal area.

Preferred compositions in accordance with the present invention include from about 0.5 weight percent to about 5 weight percent water and from about 0.5 weight percent to about 5 weight percent surfactant. The ratio of the water to surfactant will depend upon the particular surfactant employed. If too little surfactant is used, the water may not be finely dispersed within the oil phase in the form of a water-in-oil emulsion. If too much surfactant is used, the excess surfactant would be wasted.

In one alternative of a preferred embodiment, the composition includes, in addition to water and surfactant, from about 21 to about 78 weight percent oil, from about 21 to about 70 weight percent wax and from about 1 to about 30 weight percent microbeads. In an alternative preferred embodiment of the present invention, in addition to the water and surfactant, the composition contains from about 10 to about 60 weight percent microbreads, from about 8 to about 34 weight percent wax and from about 26 to about 81 weight percent oil.

The resinous package material may be made up of any natural or synthetic resin which is capable of being sealed using dielectric heating. Preferably, the material is a thermoplastic resin. Preferably, the resinous material is polar, for example, polyurethane or polyvinyl (e.g. polyvinylchloride) material. Other suitable materials can include: acrylonitrile-butadiene-styrene (ABS) resins; acetals; acrylics; cellulosics; chlorinated polyethers; fluorocarbons, such as polytetrafluoroethylene (TFE), polychlorotrifluoroethylene (CTEE), and fluorinated ethylene propylene (FEP); nylons (polyamides), polycarbonates; polyethylenes (including copolymers); polybutylenes; polypropylenes; polystyrenes; polyesters; and polysulfones.

When non-polar resinous materials are used in the process, a means must be employed to enable the dielectric heating device to heat the material. This can be accomplished by incorporating polar materials in a non-polar resinous material, for example, by incorporating polar salts into the material. Alternatively, it has surprisingly been found that if a layer of polar resinous material is placed over the nonpolar material, effective heating and sealing can result. For example, polyurethane, a polar material, has a higher melting temperature than polyethylene, a non-polar material. When polyurethane is placed over two layers of polyethylene material and radio frequency energy is applied, the polyethylene material can be effectively sealed together, in spite of its non-polar nature. Polyethylene is desirable in some applications because it has a good feel or "hand" and is less expensive than polyurethane.

While not wishing to be bound by any explanation or theory, dielectric heating refers to the heat developed in certain materials when exposed to an alternating electric field. The material to be heated is placed between two electrodes. It is not necessary that the electrodes be in contact with the material to be heated. If the material to be heated is homogeneous and the electric field uniform, heat is developed uniformly and simultaneously throughout the mass of the material. The thermal conductivity of the material is a negligible factor in the rate of heating.

The frequency and voltage of the dielectric heating device depend in each case on the electrical properties of the material to be heated and the desired temperature for the heat application. Typical frequencies range from 2 to 40 MHz, however, it is advisable to select the frequency for heating by trial. The upper limit of voltage across the electrodes is fixed by the arcing or spark-over value and by corona. The permissible voltage gradient across the electrodes depends on the material to be heated. Typical values range from 2,000 to 6,000 volts per inch and typically the voltage across the electrodes should not exceed 15,000 volts.

EXAMPLES

EXAMPLE I

A first flowable, pressure-compensating material formulation was prepared comprising the following ingredients:

18.6 weight percent wax, designated "Paxwax 8852," available from National Wax Company, Skokie, Ill.;

5.5 weight percent oil, designated "Chevron Utility 100", available from Chevron, Inc.;

19.6 weight percent microbeads, designated "B-23" microbeads, available from 3M Company, St. Paul, Minn.;

5.1 percent surfactant, designated "BRIJ-76," available from ICI Americas, Inc.;

1.0 weight percent water.

A second formulation was prepared comprising the following ingredients:

34.7 weight percent wax, designated "Paxwax 8852," available from National Wax Company, Skokie, Ill.;

34.7 weight percent oil, designated "Chevron Utility 100," available from Chevron, Inc.;

25.7 weight percent microbeads, designated "B-23" microbeads, available from 3M Company, St. Paul, Minn.;

3.9 percent surfactant, designated "BRIJ-92," available from ICI Americas, Inc.;

1.0 weight percent water.

Formulation No. 1 was placed in a vacuum formed cup-shaped piece made of resinous material. The resinous material cup was vacuum formed from a 20 mil thick piece of urethane, designated "MP1880" and available from Stevens Company. The cup-shaped piece was filled with formulation no. 1. A second, flat piece of urethane material was placed on top of the cup-shaped piece so that overlapping sealing areas were adjacent one another and excess air was forced out.

Formulation No. 2 was placed between two sheets of clear 8 mil thick urethane, designated "PS8020" and available from Deerfield Company. The edges of the two sheets of clear urethane overlapped to provide a sealing area. Excess air was forced out from between the sheets by hand.

The sealing areas on each of the two above-mentioned packages were sealed using a radio frequency sealing device, designated "KF-41" and available from Thermatron. The power output for the device was four kilowatts at 27.12 megahertz nominal frequency. The device used 220 volt, 60 hertz current. The device was a single-phase device, at 54 amps per phase. With each of the two above-mentioned formulations, the power setting on the Thermatron KF-41 device was set at 50, with a seal time of two seconds, a cool time of six seconds, and one second delay between the time the sealing die/electrode was lowered onto the sealing area and the time the power was turned on. In both cases, a clean, strong seal was formed.

In order to obtain seals on packages containing flowable, pressure-compensating materials which did not contain water and surfactant, it was necessary to employ a power setting of 55 to 60, in other words, 10 to 20 percent higher than in the case of formulations 1 and 2. Additionally, the resultant seals were not as clean or reliable as the seals obtained with formulations 1 and 2.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method for sealing a material within a package comprising:
   (a) placing a polar liquid-containing material within a package comprising an upper sheet and a lower sheet of heat-sealable material,
   (b) applying an alternating electromagnetic energy field to a portion of said heat-sealable package using a device having electrodes,
   (c) vaporizing at least a portion of said polar liquid effective to clear the seal area of contaminating material by forcing said contaminating material out from between said sheets in a direction away from the seal area, without causing undesirable arcing between said electrodes, and
   (d) continuing said application of said alternating electromagnetic energy field until said portion of said heat-sealable package is sealed.

2. The method as claimed in claim 1 wherein said alternating electromagnetic energy field is applied by a dielectric heating device.

3. The method as claimed in claim 1 wherein said alternating electromagnetic energy field is applied by a radio frequency heating device.

4. The method as claimed in claim 1 wherein said polar liquid is water.

5. The method as claimed in claim 1 wherein said polar liquid-containing material is a material containing from about 0.5 to about 5 weight percent water.

6. The method as claimed in claim 1 wherein said heat-sealable package comprises a material selected from the group consisting of polyurethane and polyvinyl material.

7. The method as claimed in claim 1 wherein said polar liquid-containing material is a flowable, pressure-compensating material comprising:
   (a) polar liquid,
   (b) surfactant,
   (c) wax,
   (d) oil, and
   (e) microbeads.

8. The method as claimed in claim 1 wherein said heat-sealable package comprises a non-polar material and the sealing of said non-polar package is accomplished by placing a polar material adjacent to the seal area during the sealing process.

9. A sealing process comprising:
   (a) vacuum molding a first piece of resinous material in order to achieve a desired shape,
   (b) placing flowable, pressure-compensating material within said vacuum molded resinous material, said flowable, pressure-compensating material containing from 0.5 weight percent to about 5 weight percent water,
   (c) placing a second piece of resinous material adjacent said first vacuum molded piece,
   (d) removing air from between the two pieces of resinous material,
   (e) applying radio frequency energy using a device having electrodes to overlapping edges of said two pieces of resinous materials until said water in said flowable, pressure-compensating material vaporizes in order to clear the seal area of flowable, pressure-compensating material by forcing said material out from between said two pieces of resinous material in a direction away from the seal area, without causing undesirable arcing between said electrodes, and
   (f) continuing said radio frequency energy until portions of said two pieces of resinous material seal together.

10. The method for sealing a material within a package as claimed in claim 1, wherein said upper and lower sheets are of a first resinous material being transparent to an alternating electromagnetic energy field, said method further comprising:
    (a) placing a second material which is heatable by exposure to an alternating electromagnetic energy field adjacent to the area of said sheets to be sealed together, and
    (b) applying an alternating electromagnetic energy field to the area of said sheets to be sealed together until said second material is heated sufficiently to cause sealing between said sheets.

* * * * *

UNITED STATES PATENT AND TRADEMARK OFFICE
CERTIFICATE OF CORRECTION

PATENT NO. : 5,015,313　　　　　　　　　　　　　　　Page 1 of 2

DATED : May 14, 1991

INVENTOR(S) : Terrence M. Drew, et al

It is certified that error appears in the above-identified patent and that said Letters Patent is hereby corrected as shown below:

Column 4, line 61, after "4" insert a period.

Columns 7 and 8, should be inserted as per attached page.

Signed and Sealed this

Twenty-second Day of June, 1993

*Attest:*

MICHAEL K. KIRK

*Attesting Officer*　　　*Acting Commissioner of Patents and Trademarks* surfactant is used, the excess surfactant would be wasted.

In one alternative of a preferred embodiment, the composition includes, in addition to water and surfactant, from about 21 to about 78 weight percent oil, from about 21 to about 70 weight percent wax and from about 1 to about 30 weight percent microbeads. In an alternative preferred embodiment of the present invention, in addition to the water and surfactant, the composition contains from about 10 to about 60 weight percent microbeads, from about 8 to about 34 weight percent wax and from about 26 to about 81 weight percent oil.

The resinous package material may be made up of any natural or synthetic resin which is capable of being sealed using dielectric heating. Preferably, the material is a thermoplastic resin. Preferably, the resinous material is polar, for example, polyurethane or polyvinyl (e.g. polyvinylchloride) material. Other suitable materials can include: acrylonitrile-butadiene-styrene (ABS) resins; acetals; acrylics; cellulosics; chlorinated polyethers; fluorocarbons, such as polytetrafluoroethylene (TFE), polychlorotrifluoroethylene (CTEE), and fluorinated ethylene propylene (FEP); nylons (polyamides), polycarbonates; polyethylenes (including copolymers); polybutylenes; polypropylenes; polystyrenes; polyesters; and polysulfones.

When non-polar resinous materials are used in the process, a means must be employed to enable the dielectric heating device to heat the material. This can be accomplished by incorporating polar materials in a non-polar resinous material, for example, by incorporating polar salts into the material. Alternatively, it has surprisingly been found that if a layer of polar resinous material is placed over the nonpolar material, effective heating and sealing can result. For example, polyurethane, a polar material, has a higher melting temperature than polyethylene, a non-polar material. When polyurethane is placed over two layers of polyethylene material and radio frequency energy is applied, the polyethylene material can be effectively sealed together, in spite of its non-polar nature. Polyethylene is desirable in some applications because it has a good feel or "hand" and is less expensive than polyurethane.

While not wishing to be bound by any explanation or theory, dielectric heating refers to the heat developed in certain materials when exposed to an alternating electric field. The material to be heated is placed between two electrodes. It is not necessary that the electrodes be in contact with the material to be heated. If the material to be heated is homogeneous and the electric field uniform, heat is developed uniformly and simultaneously throughout the mass of the material. The thermal conductivity of the material is a negligible factor in the rate of heating.

The frequency and voltage of the dielectric heating device depend in each case on the electrical properties of the material to be heated and the desired temperature for the heat application. Typical frequencies range from 2 to 40 MHz, however, it is advisable to select the frequency for heating by trial. The upper limit of voltage across the electrodes is fixed by the arcing or spark-over value and by corona. The permissible voltage gradient across the electrodes depends on the material to be heated. Typical values range from 2,000 to 6,000 volts per inch and typically the voltage across the electrodes should not exceed 15,000 volts.

EXAMPLES

EXAMPLE I

A first flowable, pressure-compensating material formulation was prepared comprising the following ingredients:

18.6 weight percent wax, designated "Paxwax 8852," available from National Wax Company, Skokie, Ill.;

5.5 weight percent oil, designated "Chevron Utility 100", available from Chevron, Inc.;

19.6 weight percent microbeads, designated "B-23" microbeads, available from 3M Company, St. Paul, Minn.;

5.1 percent surfactant, designated "BRIJ-76," available from ICI Americas, Inc.;

1.0 weight percent water.

A second formulation was prepared comprising the following ingredients:

34.7 weight percent wax, designated "Paxwax 8852," available from National Wax Company, Skokie, Ill.;

34.7 weight percent oil, designated "Chevron Utility 100," available from Chevron, Inc.;

25.7 weight percent microbeads, designated "B-23" microbeads, available from 3M Company, St. Paul, Minn.;

3.9 percent surfactant, designated "BRIJ-92," available from ICI Americas, Inc.;

1.0 weight percent water.

Formulation No. 1 was placed in a vacuum formed cup-shaped piece made of resinous material. The resinous material cup was vacuum formed from a 20 mil thick piece of urethane, designated "MP1880" and available from Stevens Company. The cup-shaped piece was filled with formulation no. 1. A second, flat piece of urethane material was placed on top of the cup-shaped piece so that overlapping sealing areas were adjacent one another and excess air was forced out.

Formulation No. 2 was placed between two sheets of clear 8 mil thick urethane, designated "PS8020" and available from Deerfield Company. The edges of the two sheets of clear urethane overlapped to provide a sealing area. Excess air was forced out from between the sheets by hand.

The sealing areas on each of the two above-mentioned packages were sealed using a radio frequency sealing device, designated "KF-41" and available from Thermatron. The power output for the device was four kilowatts at 27.12 megahertz nominal frequency. The device used 220 volt, 60 hertz current. The device was a single-phase device, at 54 amps per phase. With each of the two above-mentioned formulations, the power setting on the Thermatron KF-41 device was set at 50, with a seal time of two seconds, a cool time of six seconds, and one second delay between the time the sealing die/electrode was lowered onto the sealing area and the time the power was turned on. In both cases, a clean, strong seal was formed.

In order to obtain seals on packages containing flowable, pressure-compensating materials which did not contain water and surfactant, it was necessary to employ a power setting of 55 to 60, in other words, 10 to 20 percent higher than in the case of formulations 1 and 2. Additionally, the resultant seals were not as clean or reliable as the seals obtained with formulations 1 and 2.

While various embodiments of the present invention have been described in detail, it is apparent that modifications and adaptations of those embodiments will